(12) United States Patent
Hinshaw et al.

(10) Patent No.: US 10,556,275 B2
(45) Date of Patent: Feb. 11, 2020

(54) MINE DRILL SYSTEM WITH ADAPTER

(71) Applicant: J.H. FLETCHER & CO., Huntington, WV (US)

(72) Inventors: Gregory E. Hinshaw, Proctorville, OH (US); Timothy D. Burgess, South Point, OH (US)

(73) Assignee: J.H. FLETCHER & CO., Huntington, WV (US)

( * ) Notice: Subject to any disclaimer, the term of this patent is extended or adjusted under 35 U.S.C. 154(b) by 0 days.

(21) Appl. No.: 15/849,009

(22) Filed: Dec. 20, 2017

(65) Prior Publication Data

US 2018/0169841 A1 Jun. 21, 2018

Related U.S. Application Data

(60) Provisional application No. 62/436,908, filed on Dec. 20, 2016.

(51) Int. Cl.
*B23B 31/00* (2006.01)
*B25B 23/00* (2006.01)
*B23B 31/113* (2006.01)
*B23B 31/117* (2006.01)
(Continued)

(52) U.S. Cl.
CPC .......... *B23B 31/008* (2013.01); *B23B 31/113* (2013.01); *B23B 31/117* (2013.01); *B25B 23/0035* (2013.01); *B23B 2231/024* (2013.01); *B23B 2231/0232* (2013.01); *B23B 2231/0264* (2013.01); *B23B 2231/0276* (2013.01); *B23B 2231/04* (2013.01); *E21B 17/03* (2013.01); *E21D 21/00* (2013.01); *Y10T 279/17008* (2015.01); *Y10T 279/17888* (2015.01);
(Continued)

(58) Field of Classification Search
CPC . B23B 31/113; B23B 2231/04; B23B 31/008; B23B 31/117; B25B 23/0035; Y10T 279/17008; Y10T 279/3406; Y10T 279/3412; Y10T 279/3418
See application file for complete search history.

(56) References Cited

U.S. PATENT DOCUMENTS

| 986,829 | A | * | 3/1911 | Kasperson | ............ | B23B 51/123 |
| | | | | | | 279/103 |
| 1,256,222 | A | * | 2/1918 | Grabill | .................. | B23B 51/123 |
| | | | | | | 279/103 |

(Continued)

FOREIGN PATENT DOCUMENTS

| WO | WO8600247 | | 1/1986 |
| ZA | 9107920 | | 12/1992 |
| ZA | 9107920 | A * | 12/1992 |

*Primary Examiner* — Eric A. Gates
(74) *Attorney, Agent, or Firm* — King & Schickli, PLLC

(57) ABSTRACT

A system for securing different first and second drill tools to a drill head including a socket is provided. The system includes a chuck adapted for positioning at least partially within the socket of the drill head, the chuck including a first opening for receiving the first drill tool. An adapter is configured for forming a selective locking engagement within the first opening of the chuck, the adapter including a second opening for receiving the second drill tool. The selective locking engagement may comprise a "twist lock" engagement, and the adapter may be arranged for receiving a roof bolt. Related methods are also disclosed.

19 Claims, 7 Drawing Sheets

(51) Int. Cl.
*E21D 21/00* (2006.01)
*E21B 17/03* (2006.01)

(52) U.S. Cl.
CPC ...... *Y10T 279/17965* (2015.01); *Y10T 279/28* (2015.01); *Y10T 279/3412* (2015.01)

(56) References Cited

U.S. PATENT DOCUMENTS

| | | | | |
|---|---|---|---|---|
| 3,411,796 | A * | 11/1968 | Decker | B23B 31/202 279/145 |
| 3,734,515 | A * | 5/1973 | Dudek | B25B 23/0035 173/29 |
| 4,006,787 | A | 2/1977 | Rumpp et al. | |
| 4,226,290 | A | 10/1980 | McSweeney | |
| 4,454,922 | A * | 6/1984 | Jamison | E21B 17/03 175/320 |
| 4,632,195 | A | 12/1986 | Emmerich | |
| 4,834,594 | A | 5/1989 | Morgan | |
| 5,257,557 | A * | 11/1993 | Battten | B23B 31/113 279/93 |
| 5,325,931 | A | 7/1994 | Woods | |
| 6,145,603 | A | 11/2000 | Weaver et al. | |
| 6,367,567 | B1 | 4/2002 | Massa et al. | |
| 6,623,220 | B2 * | 9/2003 | Nuss | B23B 31/1071 279/75 |
| 7,036,401 | B2 * | 5/2006 | Carroll | B25B 13/06 81/124.4 |
| 7,207,400 | B2 | 4/2007 | Bise et al. | |
| 7,331,738 | B2 * | 2/2008 | Hofbrucker | B25B 21/007 279/145 |
| 7,334,970 | B2 * | 2/2008 | Kozak | B23B 31/005 279/137 |
| 7,381,012 | B2 | 6/2008 | Hinshaw et al. | |
| 7,549,953 | B2 * | 6/2009 | Walters | B23B 31/20 279/143 |
| 8,220,135 | B2 * | 7/2012 | Vogel | B25B 13/5091 279/144 |
| 8,302,708 | B1 | 11/2012 | Cox et al. | |
| 9,193,045 | B2 * | 11/2015 | Saur | B25B 21/00 |
| 9,468,977 | B2 * | 10/2016 | McCormick | B23B 31/08 |
| 9,883,853 | B2 * | 2/2018 | Woodard | A61B 10/025 |
| 2005/0098001 | A1 * | 5/2005 | Walker | B25B 13/06 81/439 |
| 2014/0298692 | A1 | 10/2014 | Marchand | |
| 2018/0085834 | A1 * | 3/2018 | Grolimund | B23B 31/008 |

* cited by examiner

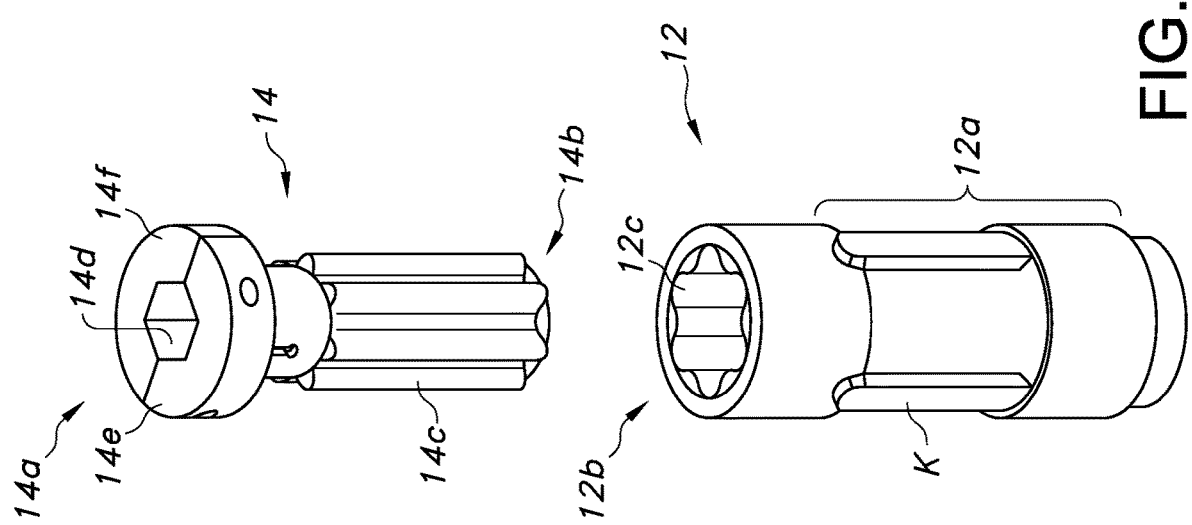

MINE DRILL SYSTEM WITH ADAPTER

This application claims the benefit of U.S. Provisional Patent Application Ser. No. 62/436,908, the disclosure of which is incorporated herein by reference.

TECHNICAL FIELD

This disclosure relates to the mining arts, and more particularly, to a system for use in selectively drilling into a face (roof or rib) of a mine passage

BACKGROUND

Typical drilling operations in underground mines use a drill head including a socket adapted to receive a proximal end of a drill steel and thus impart rotary driving force for forming a borehole. Unlike a conventional handheld drill with an integral, adjustable chuck, the socket is typically a fixed dimension structure, and adapted to work in connection with a removable chuck designed to withstand the significant driving forces and harsh operating conditions. Thus, thus the drill steel must be specially adapted (e.g., have a particular shape and size) to fit in a particular chuck, or else it will potentially loosen during the drilling operation (and particularly, during withdrawal of the drilling steel from the borehole once formed).

In the past, others have proposed so-called "twist lock" systems, whereby a steel can be inserted in the chuck and twisted to achieve a selectively locked configuration (see, e.g., U.S. Pat. No. 4,226,290, the disclosure of which is incorporated herein by reference). While this system works for its intended purpose, it cannot reliably accommodate different sizes of steels beyond a certain range, such as ones with a smaller maximum diameter, or those without twist lock capabilities. In the situation where a twist lock arrangement is not present (e.g., a hex receiver and a hex drill steel), the driving for purposes of drilling the borehole might proceed unfettered, but the operator must then exercise considerable care in withdrawing the steel from the borehole. This is typically done by slowing the rotation and withdrawal speed, both of which contribute to a lack of efficiency. The twist lock arrangement also requires providing a drill steel, which is a wear part, with a costly forged end to form the engagement, which is disadvantageous for obvious reasons.

Accordingly, a need is identified for a system whereby a variety of different sizes and shapes of drill steels or other drillings tools, such as bolts, may be accommodated by a single drill head without hindering the efficiency of the drilling operation. In particular, the arrangement would enhance the flexibility of the operation by allowing for the use of a variety of tools with a single chuck, and also promote efficiency by ensuring that a secure locking engagement is established using conventional "off the shelf" components that need not be modified in any way. Significant reductions in costs would result from the enhancements afforded.

SUMMARY

A system for securing different first and second drill tools to a drill head including a socket is disclosed. The system comprises a chuck adapted for positioning at least partially within the socket of the drill head, the chuck including a first opening adapted for receiving the first drill tool. An adapter is configured for forming a selective locking engagement within the first opening of the chuck, the adapter including a second opening for receiving the second drill tool.

In one embodiment, the chuck includes a plurality of keys for engaging keyways in the socket of the drill head. The chuck may further include a plurality of internal projections within the first opening and the adapter includes a plurality of external projections alternating in position with the internal projections to form the selective locking engagement. The plurality of external projections may provide the adapter with a petaloidal cross-sectional shape.

The plurality of internal projections may comprise a first set of projections having a first circumferential dimension and a second set of projections having a second circumferential dimension greater than the first circumferential dimension. Thus, the plurality of external projections on the adapter may pass through the first set of projections and move within the second set of projections when the adapter is twisted within the chuck to form the selective locking engagement for secure driving of the associated drill tool.

In some embodiments, the first opening comprises a polygonal shape, such as for instance a hexagonal shape. The first opening may comprise a variable diameter. For example, the adapter may comprise a split collar forming the first opening. The adapter may also comprise a locator adapted for insertion in the chuck.

A further aspect of the disclosure pertains to an apparatus for drilling using a drill head including a socket. The apparatus comprises a drill tool having a proximal end and a distal end. An adapter includes a variable diameter opening for receiving the proximal end of the drill tool.

In one embodiment, the adapter comprises a split collar forming the opening. The proximal end of the drill tool has a hexagonal cross-section. The opening in the adapter may have a hexagonal shape.

The apparatus may further comprise a chuck adapted for positioning at least partially within the socket of the drill head. The chuck includes an opening for receiving the drill tool. The adapter may be configured for engaging the opening of the chuck.

The chuck may include a plurality of keys for engaging keyways in the socket of the drill head. The chuck may further include a plurality of internal projections within the opening and the adapter includes a plurality of external projections alternating in position with the internal projections to form a secure driving engagement. The plurality of external projections provide the adapter with a petaloidal cross-sectional shape.

As for the chuck, the plurality of internal projections may comprise a first set of projections having a first circumferential dimension and a second set of projections having a second circumferential dimension greater than the first circumferential dimension. Consequently, the plurality of external projections on the adapter may pass through the first set of projections and move within the second set of projections when the adapter is twisted within the chuck to form a secure locking engagement.

The chuck may include a plurality of internal projections within the opening. The drill tool may include a plurality of external projections alternating in position with the internal projections to form a secure driving engagement. The plurality of external projections provide the adapter with a petaloidal cross-sectional shape.

In one embodiment, the plurality of internal projections comprise a first set of projections having a first circumferential dimension. A second set of projections has a second circumferential dimension greater than the first circumferential dimension. The external projections may pass through the first set of projections and move within the second set of projections when the drill tool is twisted within the chuck to form a selectively releasable locking engagement. The adapter may also include a locator adapted for insertion in the chuck.

This disclosure also pertains to a method of operating a drill. The method comprises positioning a first drill tool in a chuck in a socket of a drill head. The method further includes the step of removing the first drill tool and positioning an adapter associated with a second drill tool in the chuck.

The method in one embodiment further includes the step of twisting the adapter relative to the chuck after the positioning step to form a secure locking engagement. The first drill tool may comprise a bolt having a square cross-sectional shape, and the method comprises inserting the bolt into an opening in the chuck, the opening having inwardly directed projections providing the chuck with a petaloidal cross-sectional shape.

A further aspect of the disclosure also relates to a method of operating a drill. The method comprises positioning a first drill tool in an adapter, and positioning the adapter in a chuck associated with a socket of a drill head. The method further comprises removing the adapter from the chuck and positioning a second drill tool in the chuck.

The method may further include the step of twisting the adapter relative to the chuck after the positioning step to form a secure locking engagement. Still further, the method may include the step of twisting the second drill tool relative to the chuck after the positioning step to form a releasable, but secure locking engagement.

Also disclosed is a kit for drilling a face of a mine passage using first and second drill tools of different shapes or geometries. The kit comprises a first adapter having a first opening for receiving the first drill tool. The kit further comprises a second adapter having a second opening different from the first opening for receiving the second drill tool.

In one embodiment, the kit further includes a chuck adapted for positioning at least partially within a socket of a drill head. The first and second adapters may each be configured for engaging the chuck. The chuck may include a plurality of internal projections within the first opening and each of the first and second adapters may include a plurality of external projections alternating in position with the internal projections to form a secure driving engagement.

In one embodiment, the plurality of internal projections comprises a first set of projections having a first circumferential dimension. A second set of projections have a second circumferential dimension greater than the first circumferential dimension. Thus, the plurality of external projections on each adapter may pass through the first set of projections and move within the second set of projections when the adapter is twisted to form a secure locking engagement.

Also disclosed is a method of drilling. The method comprises providing an adapter including a plurality of outward projections and a depending portion and into a chuck including a plurality of grooves for engaging the projections. The method further comprises at least partially inserting the depending portion of the adapter into the chuck, and rotating the chuck to align the projections with the grooves. The method also comprises further inserting the adapter into the chuck.

This disclosure also describes a chuck for a drill having a plurality of internal projections forming an opening with a petaloidal cross-sectional shape for receiving and driving a square bolt or an adapter having a non-square cross-section. The adapter has a plurality of projections forming a petaloidal cross-sectional shape. The chuck is adapted to have a twist-lock configuration.

The chuck may further include a plurality of internal projections, and wherein the adapter includes a plurality of external projections alternating in position with the internal projections to form a secure driving engagement. The plurality of internal projections may comprise a first set of projections having a first circumferential dimension and a second set of projections having a second circumferential dimension greater than the first circumferential dimension, whereby the plurality of external projections on each adapter may pass through the first set of projections and move within the second set of projections when the adapter is twisted within the chuck to form a secure locking engagement.

Yet another aspect of the disclosure is a drill steel having a proximal end portion with a petaloidal cross-sectional shape. A distal end portion of the drill steel is polygonal in cross-section. The proximal end portion comprises a plurality of external projections forming the petaloidal cross-sectional shape.

BRIEF DESCRIPTION OF THE DRAWING FIGURES

The above and further advantages of the present invention may be better understood by referring to the following description in conjunction with the accompanying drawings in which:

FIG. 3 is an partially exploded perspective view of a chuck and adapter for associating a drilling element or roof bolt with the drill head;

Figure 2:
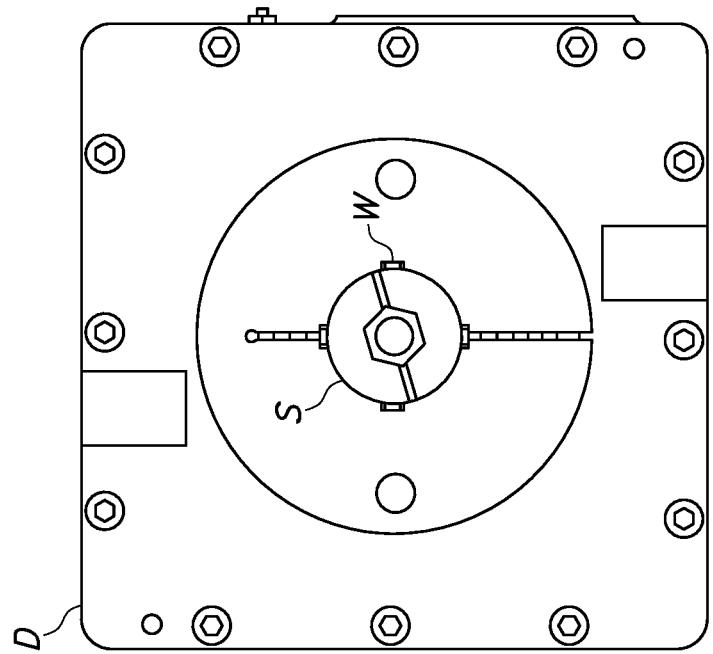
FIG. 2 is a top view of the drill head of FIG. 1.

The drawings are not necessarily drawn proportionally or to scale. For example, the dimensions of some of the elements may be exaggerated relative to other elements for clarity or several physical components may be included in one functional block or element. Further, sometimes reference numerals may be repeated among the drawings to indicate corresponding or analogous elements.

DETAILED DESCRIPTION

Referring now to FIGS. 1-10, this disclosure relates to a system 10 for securing a drilling element or steel in a socket S of a drill head D, such as one associated with an underground mining machine (e.g., a "roof" bolter). The roof bolter may be of the type described and shown in U.S. Pat.

No. 7,381,012, the disclosure of which is incorporated herein by reference, but may take other forms, without limitation.

Figure 1:
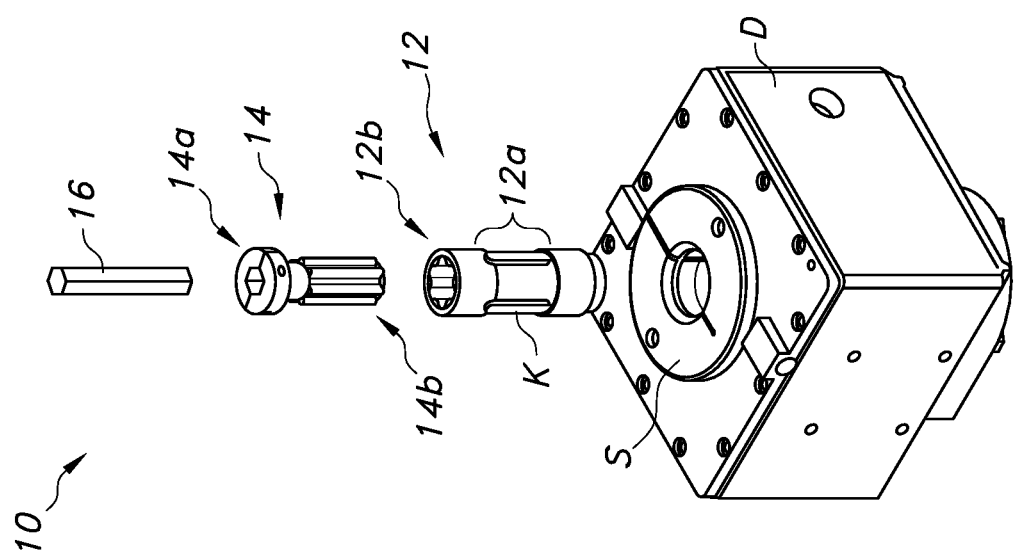
FIG. 1 is a perspective view of a drill head.

In the illustrated embodiment of FIG. 1, the system 10 comprises a first component, such as a chuck 12, which is adapted for interfacing with the socket S of the drill head D. The system 10 further includes a second component, such as an adapter 14, which is adapted for interfacing with both the chuck 12 and a drilling element or steel 16. Thus, in the simplest form, as shown in FIG. 1, the lower or male end 12a of the chuck 12 engages the socket S (such as through radially extending keys K for engaging corresponding keyways W), and the male lower end 14b of adapter 14 connected to the drill steel 16 engages the upper or female end 12b of the chuck.

Figure 4C:
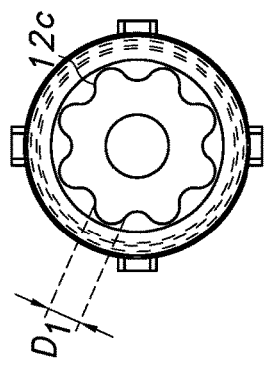
FIG. 4C is a top view of the chuck.
Figure 4B:
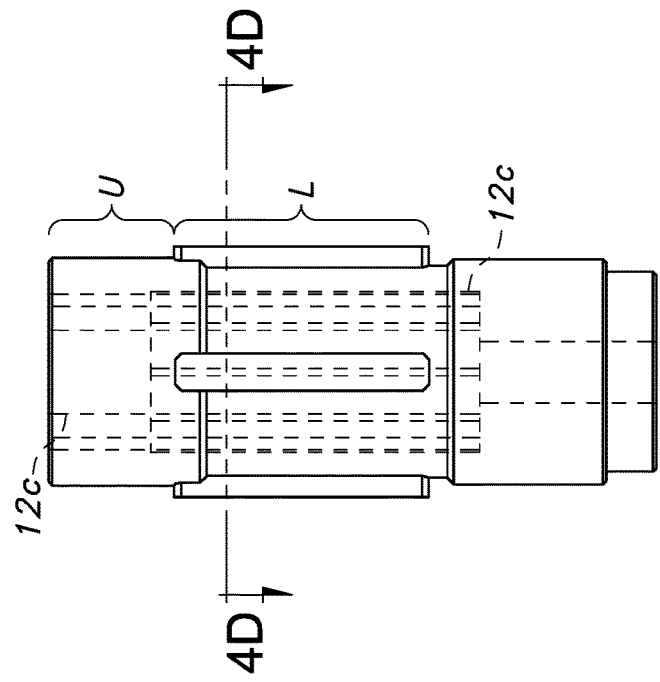
FIG. 4B is a side view of the chuck.
Figure 4A:
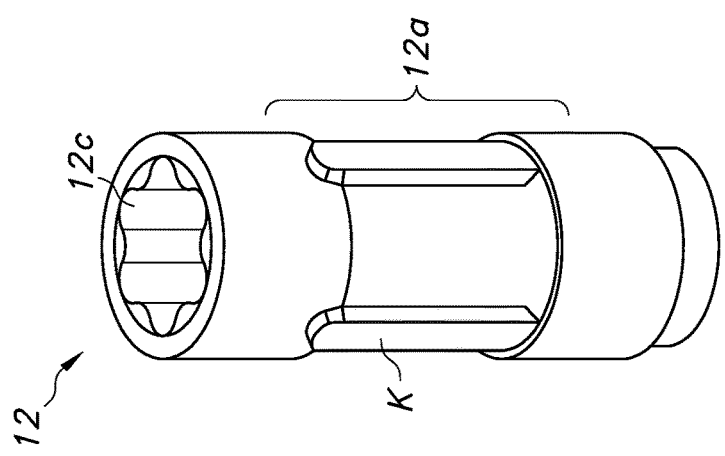
FIG. 4A is a perspective view of the chuck.
Figure 4D:
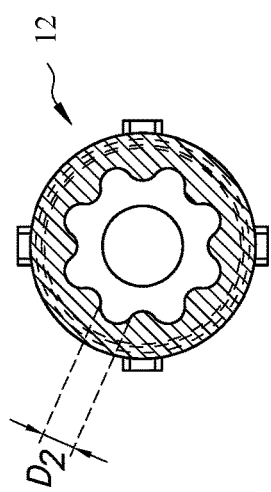
FIG. 4D is a cross-sectional view of the chuck taken along line 4D-4D of FIG. 4B.
Figure 5:
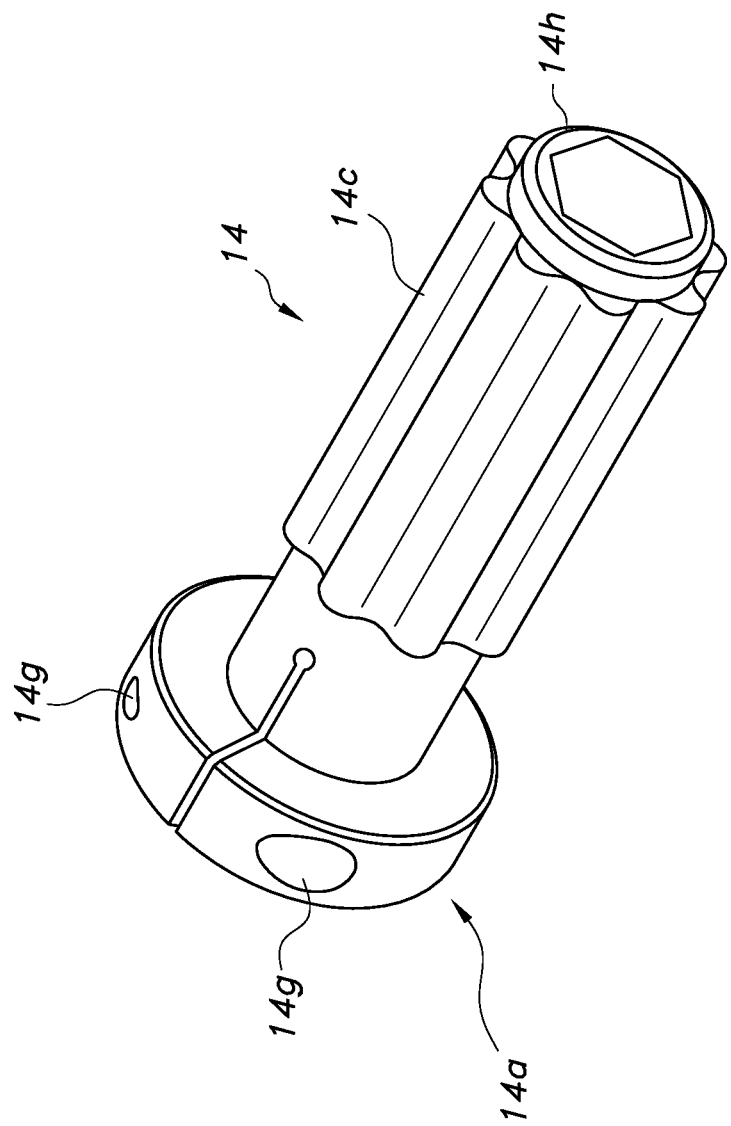
FIG. 5 is a perspective view of the adapter.

With reference to FIGS. 3-5, the manner in which the chuck 12 and the adapter 14 fit together to form a secure engagement for driving the steel 16 is illustrated. Turning first to FIG. 3, it can be understood that the chuck 12 includes a plurality of inwardly directed internal projections or lobes 12c. The lobes 12c form alternating grooves for receiving corresponding external projections or lobes 14c on the lower end 14b of the adapter 14, and thus when mated form a secure driving engagement. As perhaps best understood from FIGS. 4C and 4D, a petaloid configuration (e.g., having a petaloidal cross-sectional shape, such that a transverse slice of it generally looks like a flower) may thus be provided with a number of lobes (eight in the illustrated example), such that the adapter 14 is securely, but releasably held in the chuck 12 for purposes of being rotatably driven. While eight lobes is a preferred and important arrangement in one embodiment to increase the surface area of the driving engagement, other embodiments may include more or fewer lobes.

As can be understood from FIGS. 4A and 4D together, a lower portion L of the lobes 12c are arranged such that the gaps between them and the resulting grooves are enlarged circumferentially relative to the lobes 12c of upper portion U (compare distances $D_1$ and $D_2$). Thus, the lower, male end 14b of the adapter 14 may be fully inserted into the chuck 12 such that the upper edges of the lobes 14c clear the lower edges of the resulting offset lobes 12c along the upper portion U. At this point, the adapter 14 may be rotated or twisted in a clockwise direction to form a locking engagement that can resist movement in the drilling direction (that is, the direction of advance to form a borehole or retreat therefrom). Reversing of the twist (e.g., counterclockwise) thus allows for the adapter 14 to be freely removed.

Figure 5C:
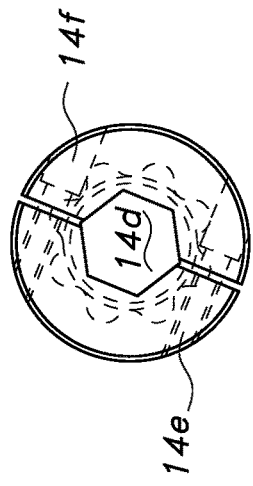
FIG. 5C is a top view of the adapter.

The upper end portion 14a of the adapter 14 is in turn adapted for securely engaging the drill steel 16. As can be appreciated from FIGS. 3 and 5C, the adapter 14 includes an opening 14d for receiving the lower end of the steel 16, and may be shaped accordingly (typically, a hexagonal configuration). The opening 14d may actually form a passage extending entirely through the adapter 14, such that it is fully mounted on the lower end portion of the drill steel 16.

Figure 5B:
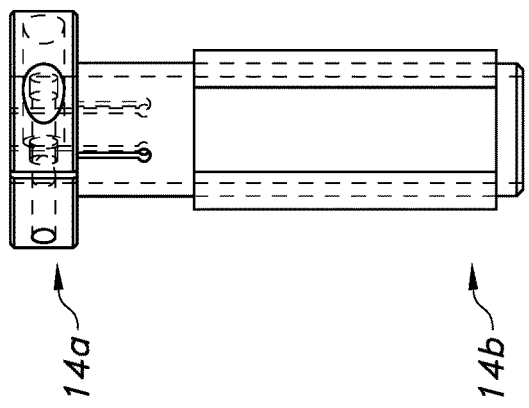
FIG. 5B is a side view of the adapter.
Figure 5A:
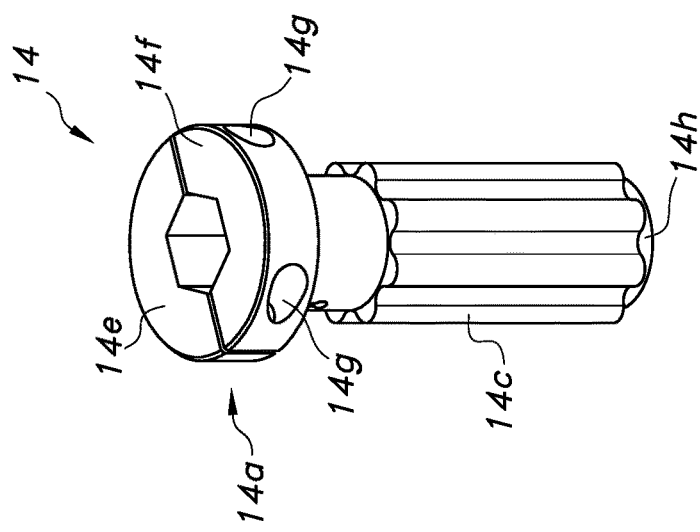
FIG. 5A is a perspective view of the adapter.

As can be understood from FIGS. 5A and 5B, the opening 14d in the adapter 14 may also be provided with a variable diameter to accommodate relative variations in the dimensions of the drill steel 16 (which may sometimes be freshly cut as a result of damage caused during the drilling operation, and thus can have peripheral burrs or the like). This may be achieved by providing the upper end portion 14a of the adapter 14 in two connectable sections 14e, 14f so as to form a split collar. This collar formed by the sections 14e, 14f also presents an oversized surface for engaging the upper face of the chuck 12 in the engaged condition, and helps to preclude debris infiltration and distribute vertical drilling forces to extend the service life of both the chuck 12 and the adapter 14.

The relative positioning of the sections 14e, 14f may be set by transverse fasteners (not shown) positioned in apertures 14g, which may thus help squeeze and secure the drill steel 16 to the adapter 14 (and thus also to the chuck 12 when the adapter is associated with it). This helps to ensure that a secure arrangement is formed for withdrawing the drill steel 16 at high speeds, and also allows for moderate variations in the proximal end of the drill steel to be accommodated without a loss of security.

From FIG. 5A, it can also be appreciated that the adapter 14 may be provided with an undersized, rounded depending portion 14h extending below the terminal ends of the lobes 12c. This portion 14h helps the operator to correctly locate the adapter 14 within the open upper end of the chuck 12. If misaligned, the adapter 14 may then simply be rotated partially within the chuck 12 until the lobes 12c align with the corresponding grooves. It can also be understood from this figure that the lobed portion of the adapter 14 is particularly long (e.g., 4 inches or more) to allow for use in connection with a "deep socket" chuck 12, and further provide a significant contact area for transmitting driving force.

Figure 7:
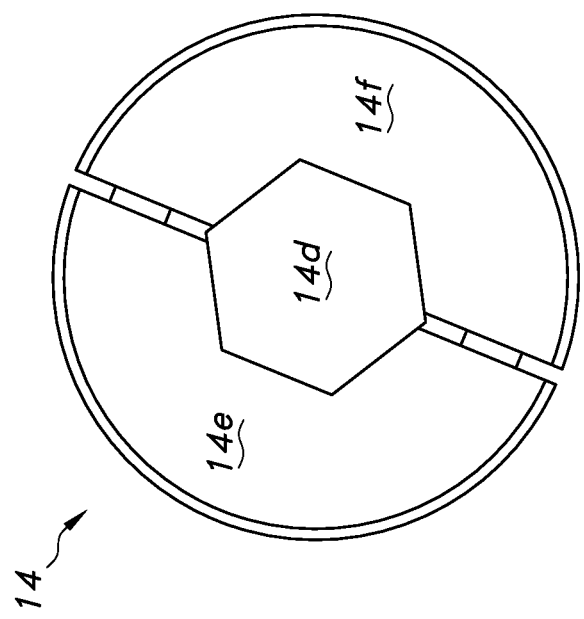
FIG. 7 is a top view of the adapter.
Figure 6:
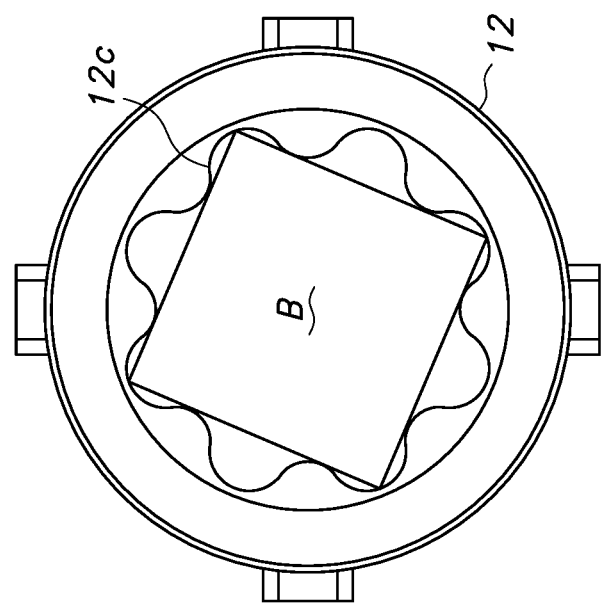
FIG. 6 is a top view illustrating the positioning of a roof bolt in the chuck.
Figure 10:
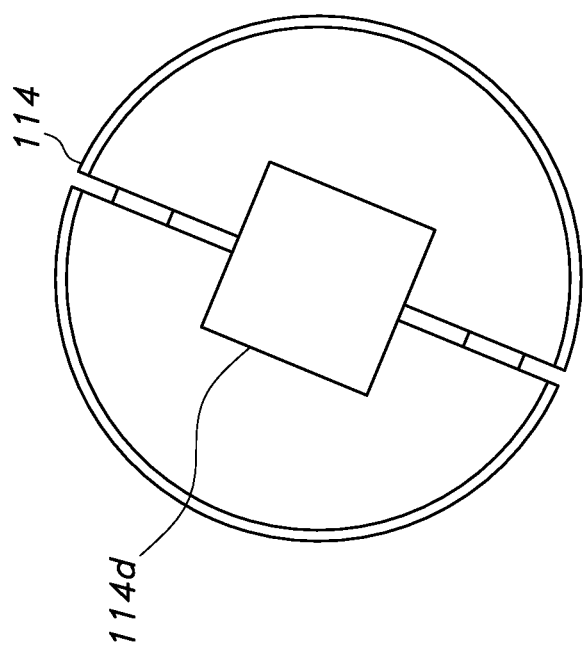
FIGS. 9 and 10 illustrate top views of alternate forms of the adapter.

Turning to FIGS. 6 and 7, it can be understood that the chuck 12 may receive an object, such as a roof bolt B, having a major dimension or diameter sufficient to engage the projections or lobes 12c and thus transmit a driving force to it. When use of a drill steel is desired, the adapter 14 may be inserted into the chuck 12, either prior to or after being secured to the drill steel 16. In this manner, the adapter 14 provides the drill head D with the enhanced capacity to accommodate a variety of different objects without modification (i.e., "off-the-shelf" parts), while maintaining the ability to create the desirable locking engagement with the chuck.

Figure 8:
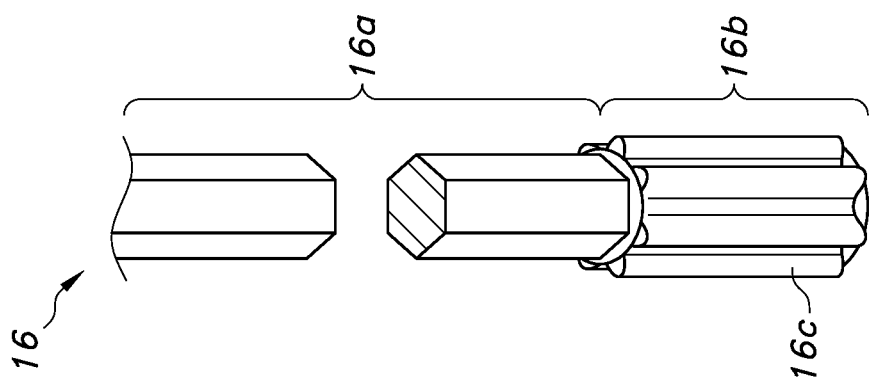
FIG. 8 illustrates a drill steel with a "twist lock" feature.

FIG. 8 further illustrates that a drill steel 16 may be adapted to work in connection with the chuck 12 to form a selective locking engagement, such as by using the above-mentioned "twist-lock" arrangement. Specifically, the upper portion 16a of the steel 16 may be conventional, having a polygonal shape (e.g., hexagonal), while the lower portion 16b may be provided with projections or lobes 16c corresponding to the lobes 12c of the chuck 12. As with the adapter 14, the drill steel 16 may thus be inserted into the chuck 12 such that the lobes 16c pass into the lower portion L and may be twisted or rotated to allow for a secure locking engagement to be formed. However, it can be appreciated that the chuck 12 is also readily adapted to receive a drill steel without the lobes 16c as well, as long as it is of suitable dimensions.

Figure 9:
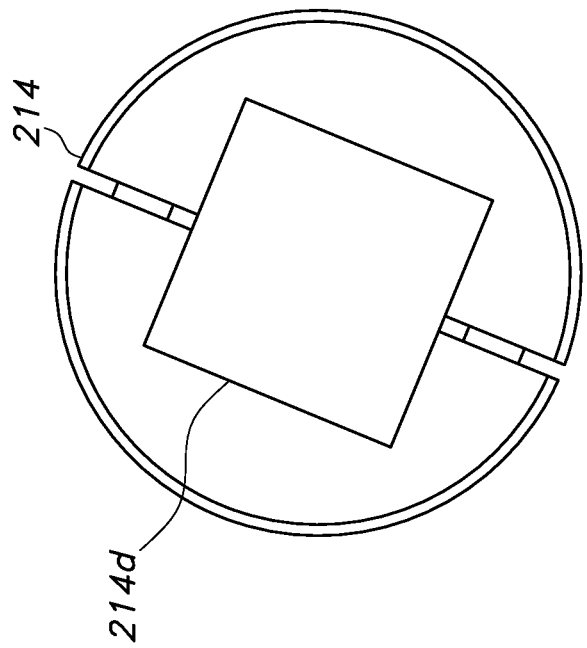

It can also be appreciated that multiple adapters 14 may be provided to correspond to a common chuck 12, and yet have openings 14d with dimensions for accommodating different sizes and shapes of drill steels 16. Thus, as indicated in FIG. 9, the adapter 114 may have a square opening 114d of one size, and a further adapter 114 may have an opening 214d of a different size. In this way, a kit of adapters 114, 214 and others of different dimensions or shapes may be kept on hand to accommodate a variety of drill steel sizes or geometries.

The lobes 12c may be equally spaced around a circle to create a configuration that reduces loads and stress by simultaneously increasing the corner radii and creating torque transmission surfaces with a high angle to the tangent of the circle. The lobes 12c may be sized, shaped and otherwise configured to accept a mining industry bolt head size of 1⅛ inch square. The lobes 12*c* may be sufficiently elongated to meet "hands off drilling" deep chuck requirements. The lobes 14*c* on adapter 14 may be large enough to make a hollow configuration for dry dust collection, and accept a ⅞" hex or ⅞" round bar so it may be used as an adapter to conventional drill steel tubing.

The foregoing descriptions of various embodiments are provided for purposes of illustration, and are not intended to be exhaustive or limiting. Modifications or variations are also possible in light of the above teachings. For instance, instead of a drill steel for drilling, the adapter 14 or chuck 12 may readily accommodate a different component, such as a tool (wrench), extender for engaging the drill steel, or a roof bolt or other form of anchor, which components are collectively referenced by the term "drill tool" as used in the appended claims. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or the context clearly dictates otherwise. For example, the phrases: "a unit", "a device", "an assembly", "a mechanism", "a component", "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase "consisting essentially of." Each of the phrases "consisting of and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

The invention claimed is:

1. A system for securing different first and second drill tools to a drill head including a socket, comprising:
   a chuck adapted for positioning at least partially within the socket of the drill head, the chuck including a first opening adapted for engaging the first drill tool; and
   an adapter configured for forming a selective locking engagement within the first opening of the chuck for preventing withdrawal of the adapter from the chuck in a drilling direction, or allowing the adapter to be withdrawn from the chuck in the absence of the locking engagement, the adapter including a second opening adapted for engaging the second drill tool;
   wherein the chuck includes a plurality of internal projections within the first opening and the adapter includes a plurality of external projections alternating in position with the internal projections to form the selective locking engagement;
   wherein the plurality of internal projections comprise a first set of projections having a first circumferential spacing and a second set of projections having a second circumferential spacing greater than the first circumferential spacing, whereby the plurality of external projections on the adapter may pass through the first set of projections and move within the second set of projections when the adapter is twisted within the chuck to form the locking engagement.

2. The system of claim 1, wherein the chuck includes a plurality of keys for engaging keyways in the socket of the drill head.

3. The system of claim 1, wherein the plurality of external projections comprise lobes, providing the adapter at least partially with a petaloidal cross-section.

4. The system of claim 1, wherein the second opening comprises an adjustable diameter opening.

5. The system of claim 1, wherein the adapter comprises a split collar forming the second opening.

6. The system of claim 1, wherein a lower end of the adapter includes a locator adapted for insertion in the chuck.

7. The system of claim 1, wherein a portion of the adapter for insertion in the first opening of the chuck has a petaloidal cross-section comprising a plurality of lobes, and the second opening has a hexagonal cross-section.

8. A system for drilling using a drill head including a socket, comprising:

first and second drill tools for securing to the socket of the drill head, the first drill tool having a first end portion with a first cross-sectional shape and the second drill tool having a second end portion with a second cross-sectional shape different from the first cross-sectional shape;

a chuck adapted for positioning at least partially within the socket of the drill head, the chuck including a first opening adapted for engaging the first end portion of the first drill tool; and further comprising an adapter configured for forming a selective locking engagement within the first opening of the chuck for preventing withdrawal of the adapter from the chuck in a drilling direction, or allowing the adapter to be withdrawn from the chuck in the absence of the locking engagement, the adapter including a second opening for engaging the second end portion of the second drill tool.

9. The system of claim 8, wherein the chuck includes a plurality of keys for engaging keyways in the socket of the drill head.

10. The system of claim 8, wherein the chuck includes a plurality of internal projections within the first opening and the adapter includes a plurality of external projections alternating in position with the internal projections to form the selective locking engagement.

11. The system of claim 10, wherein the plurality of external projections comprise rounded lobes, providing the adapter at least partially with a petaloidal cross-section.

12. The system of claim 10, wherein the plurality of internal projections comprise a first set of projections having a first circumferential spacing and a second set of projections having a second spacing dimension greater than the first circumferential spacing, whereby the plurality of external projections on the adapter may pass through the first set of projections and move within the second set of projections when the adapter is twisted within the chuck to form the locking engagement.

13. The system of claim 8, wherein the second opening comprises an adjustable diameter opening.

14. The system of claim 13, wherein the adjustable diameter opening has a hexagonal cross-section.

15. The system of claim 8, wherein the first end portion of the first drill tool for insertion in the first opening of the chuck comprises a square cross-section, a portion of the adapter for insertion in the first opening of the chuck has a petaloidal cross-section comprising a plurality of lobes, and the second opening has a hexagonal cross-section.

16. The system of claim 8, wherein the first drill tool comprises a roof bolt and the second drill tool comprises a drill steel.

17. The system of claim 16, wherein the roof bolt has a square cross-section at the first end portion and the drill steel has a hexagonal cross-section at the first end portion.

18. A system for securing different first and second drill tools to a drill head including a socket, comprising:
a chuck adapted for positioning at least partially within the socket of the drill head, the chuck configured for engaging the first drill tool;
further comprising an adapter configured for engaging the second drill tool, and
means for selectively forming a secure locking engagement for preventing withdrawal of the adapter from the chuck in a drilling direction, or allowing the adapter to be withdrawn from the chuck in the absence of the secure locking engagement.

19. The system of claim 18, wherein the means for selectively forming the secure locking engagement comprises a plurality of internal projections on the chuck, including a first set of projections having a first circumferential spacing and a second set of projections having a second circumferential spacing greater than the first circumferential spacing, and a plurality of external projections on the adapter configured to pass through the first set of projections and move circumferentially within the second set of projections when the adapter is twisted within the chuck to form the secure locking engagement.

* * * * *